United States Patent [19]
Blanchard

[11] Patent Number: 5,902,030
[45] Date of Patent: May 11, 1999

[54] SYSTEM FOR DISPLAYING IMAGES FROM MULTIPLE PROJECTORS ONTO A COMMON SCREEN

[76] Inventor: Randall D. Blanchard, 12658 Futura St., San Diego, Calif. 92130

[21] Appl. No.: 09/087,564

[22] Filed: May 29, 1998

[51] Int. Cl.⁶ .................................................. G03B 21/14
[52] U.S. Cl. ................................................ 353/30; 353/94
[58] Field of Search ................................ 353/29, 30, 37, 353/70, 79, 94

[56] References Cited

U.S. PATENT DOCUMENTS

| | | |
|---|---|---|
| 2,023,970 | 1/1935 | Newman . |
| 2,898,804 | 8/1959 | Ragan ......................................... 353/30 |
| 3,208,341 | 9/1965 | Hosterman, Jr. et al. . |
| 3,814,513 | 6/1974 | Nims et al. ................................... 353/7 |
| 3,894,797 | 7/1975 | Barowski et al. .......................... 353/30 |
| 3,909,525 | 9/1975 | Fagan ...................................... 178/7.85 |
| 4,116,553 | 9/1978 | Cohen et al. ............................... 353/31 |
| 4,387,959 | 6/1983 | Lange et al. .............................. 350/128 |
| 4,505,558 | 3/1985 | Albers et al. ............................... 353/30 |
| 4,872,750 | 10/1989 | Morishita ..................................... 353/7 |
| 4,943,156 | 7/1990 | Vanderweft ................................ 353/66 |
| 5,300,966 | 4/1994 | Uehira et al. .............................. 353/30 |
| 5,463,434 | 10/1995 | Kanayama et al. ........................ 353/94 |
| 5,626,410 | 5/1997 | Chambers et al. ......................... 353/30 |
| 5,664,353 | 9/1997 | Brauer et al. .............................. 353/94 |

FOREIGN PATENT DOCUMENTS

| | | | |
|---|---|---|---|
| 385423 | 3/1908 | France | ..................... 353/30 |
| 1510999 | 12/1966 | France . | |
| 5-107639 | 4/1993 | Japan . | |

*Primary Examiner*—William C. Dowling
*Attorney, Agent, or Firm*—Rodney F. Brown

[57] ABSTRACT

A projection display system is provided having a first off-axis projector, a second off-axis projector and a screen assembly including a display screen. The screen assembly has a center axis segmenting the assembly into two segments. The first off-axis projector produces a first image that is directed via a first image path onto the first segment of the screen assembly and the second off-axis projector produces a second image that is directed via a second image path onto the second segment of the screen assembly. The second image interfaces the first image at the center axis of the screen assembly, both images intersecting the center axis at a substantially normal angle. The screen assembly may further include a Fresnel lens positioned in the first and second image paths adjacent to the display screen for receiving and straightening the first and second images. The first and second images are tiled across the entirety of the rear face of the screen assembly. The configuration of adjacent first and second off-axis projectors enables near perfect optical alignment of the first and second images, with the seam at the interface of the first and second images virtually indistinguishable to the viewer. An alternate embodiment of the system employs four off-axis projectors tiling four images across the rear face of a screen assembly in a similar manner.

21 Claims, 6 Drawing Sheets

SYSTEM FOR DISPLAYING IMAGES FROM MULTIPLE PROJECTORS ONTO A COMMON SCREEN

TECHNICAL FIELD

The present invention relates generally to projection display systems and, more particularly, to a projection display system employing multiple projectors and a common display screen.

BACKGROUND OF THE INVENTION

The quality of an image on the display screen of a standard projection display diminishes significantly as the performance limits of the projection display are approached or exceeded. For example, the brightness of the image on the display screen is a function of the output of the projector light source and the size of the image on the display screen. Since the brightness of the image decreases as the image size increases, the brightness of the image may become unacceptably low if a relatively large image is projected onto an oversize display screen using a projector light source having an insufficient output. The resolution of the image on the display screen is a function of the resolution of the image source used in the projector of the projection display, but is independent of the size of the image on the display screen. The resolution of the image source, and correspondingly the resolution of the image on the display screen, is defined by the number of pixels provided in the horizontal and vertical direction. Conventional projection displays for displaying computer information typically have resolutions of 640 by 480, 800 by 600, or 1024 by 768, which correspond to an aspect ratio of 4:3. However, many projection display applications require the projection of higher resolution images or images having alternate aspect ratios onto the display screen.

A current challenge is to develop cost effective projection displays capable of producing images for viewing on display screens, which have relatively high resolution or which have a non-standard aspect ratio. For example, air traffic control applications can require a projection display for radar images having a high resolution of 2000 by 2000. Avionics applications can require a small panoramic projection display having a higher than conventional resolution and a wider aspect ratio. Medical imaging applications can require a projection display having a significantly higher than conventional resolution and a very high contrast. High definition television applications require a projection display having a resolution of 1700 by 1000 at a 9:16 aspect ratio for full performance. Although projection displays utilizing a single projector have been demonstrated, which exhibit the required resolutions and aspect ratios for the above-recited applications, such displays must typically be custom produced because of the limited demand for projection displays satisfying specific high-end performance requirements. As a result, the cost of high resolution projection displays is oftentimes prohibitively high relative to the cost of conventional lower resolution projection displays.

One approach to solving the problem of high cost with respect to high resolution projection displays is described with reference to FIG. 1, wherein a projection display system generally designated 10 is shown. The projection display system 10 utilizes two conventionally-sized on-axis projectors 12, 14 positioned in parallel behind a single large display screen 16. An on-axis projector is characterized by the coalignment of the projector axis and the axis of the image projected therefrom. Each of the on-axis projectors 12, 14 has a Fresnel lens 18, 20, associated with the projector. The Fresnel lenses 18, 20 are positioned side-by-side behind the screen 16 and are aligned with the images 22, 24 emanating from the on-axis projectors 12, 14, respectively. The on-axis projectors 12, 14 operate in cooperation with one another to project the two images 22, 24 side-by-side onto the screen 16 so that the two images 22, 24 appear to the viewer as a single large image having twice the size of the two smaller images 22, 24.

Producing an apparent single large image of acceptable quality by tiling two smaller side-by-side images together has proven to be problematic, however, because distortion creates a seam down the center of the apparent large image where the two smaller images 22, 24 interface. Distortion along the central seam of the image is attributable in part to brightness non-uniformities which are inherent to projection display systems. In the case of a system employing a single rear projector and a Fresnel lens which projects a nominally collimated image onto a screen, light from the on-screen image which is received by the eye of a viewer at an angle of 90° appears brighter to the viewer than light from the on-screen image which is received by the viewer at an angle other than 90°. Consequently the on-screen image has a brightness "hot spot" corresponding to the position of the viewer relative to the screen. To combat this effect, conventional projection display systems focus the on-screen image toward a position an optimum design distance from the screen where an idealized viewer is located. Light from all areas of the screen is directed to the viewer at this position, improving brightness uniformity. Even with this design, however, brightness falls off at a cosine function due to projection optics and the reduced efficiency of the Fresnel lens toward the edge of the lens.

Figure 1:
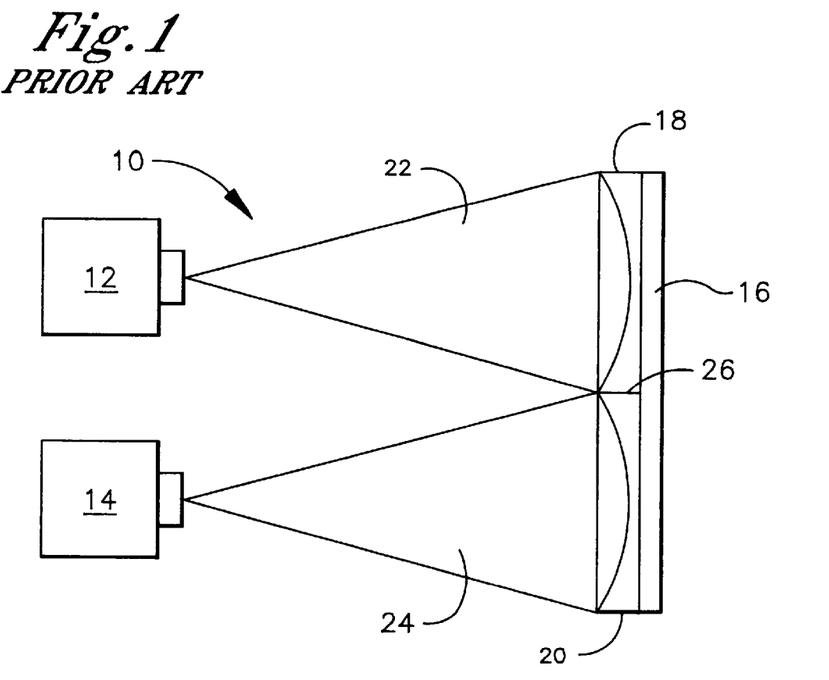
FIG. 1 is a conceptualized top view of a projection display system, wherein two on-axis projectors are employed.

The projection display system 10 of FIG. 1, which employs two on-axis projectors 12, 14, is particularly susceptible to brightness non-uniformities because the edge of the image exiting each of the Fresnel lenses 18, 20 is aligned with the center axis 26 of the screen 16. As a result, the on-screen image of the system 10 displayed to the viewer is least bright at the center of the screen 16, rather than more desirably at the edge of the screen, as in the case of a single projector system. The twin on-axis projector configuration of the system 10 also causes the brightness on one half of the screen 16 to drop off faster than the brightness on the other half of the screen 16 as the viewer moves to either side of the center axis 26. It is further noted that the image exiting each of the Fresnel lenses 18, 20 must be divergent with some distance to the screen 16 to permit alignment of the side-by-side images on the screen 16 without creating a space between them.

Distortion of the image along its central seam may also be attributable to difficulties in providing accurate geometrical alignment of the projected images with their respective Fresnel lenses 18, 20. Inaccuracies in geometrical alignment of the projected images with the Fresnel lenses 18, 20 produce unacceptable artifacts and a loss of pixel information at the seam. A large stable mechanical supporting structure is required to provide stable and accurate geometrical alignment of the images at the seam. However, such structures are impractical from both a size and cost standpoint.

It is apparent that a need exists for a projection display system that overcomes the above-recited problems inherent to tiled projection display systems. Accordingly, it is an object of the present invention to provide an effective tiled projection display system. In particular, it is an object of the present invention to provide a projection display system that cost-effectively produces a high-quality image on a display screen. It is another object of the present invention to provide such a projection display system that provides relatively uniform brightness of the image, particularly along the central axis of the screen. It is still another object of the present invention to provide such a projection display system that projects a plurality of tiled images onto a screen which are aligned to create the appearance of a single contiguous image to the viewer. It is yet another object of the present invention to provide such a projection display system wherein a relatively large image capability is achieved by increasing the resolution of the system relative to conventional systems. These objects and others are achieved by the present invention described hereinafter.

SUMMARY OF THE INVENTION

The present invention is a projection display system comprising a first off-axis projector, a second off-axis projector and a screen assembly, which includes a rear projection display screen. The rear projection display screen can be substantially any diffuse surface used to establish a viewable image. The screen assembly has a center axis segmenting the screen assembly into two segments. The first off-axis projector produces a first image that is directed via a first image path onto the first segment of the screen assembly. The first image intersects the center axis of the screen assembly at a substantially normal angle. The second off-axis projector produces a second image that is directed via a second image path onto the second segment of the screen assembly. The second image interfaces the first image at the center axis of the screen assembly, the second image also intersecting the center axis at a substantially normal angle. The center axis of the screen assembly is a vertical center axis or a horizontal center axis.

The first off-axis projector is positioned behind the screen assembly substantially adjacent to the second off-axis projector defining an axis of intersection. The screen assembly preferably further includes means positioned in the first and second image paths adjacent to the rear surface of the rear projection display screen for receiving and straightening the first and second images. The image straightening means is most preferably a Fresnel lens, substantially covering the rear surface of the display screen. In accordance with one embodiment of the present invention, the first and second off-axis projectors are directly aligned with the screen assembly, such that the projectors' axes of intersection are substantially normal to the center axis of the screen assembly. In accordance with other embodiments, the first and second off-axis projectors are not directly aligned with the screen assembly. Instead, the first and second off-axis projectors are aligned in any number of alternate configurations relative to the screen assembly and the first and second image paths are folded by means of at least one reflector positioned in the first and second image paths to redirect the first and second images onto the screen assembly.

In each of the above-recited embodiments, the first and second images are tiled across the entirety of the rear face of the screen assembly. The configuration of first and second off-axis projectors enables near perfect optical alignment of the first and second images at an interface corresponding to the center axis of the screen assembly. The first and second images are spaced less than one pixel apart, creating a seam at the interface of the first and second images which is virtually indistinguishable to the viewer. Accordingly, the viewer observes an apparent single high quality contiguous image formed on the front face of the display screen from the combined first and second images. The single on-screen image produced by tiling the two images of the two off-axis projectors onto a single screen has two times the resolution of an image of the same size produced by an equivalent single conventional off-axis projector onto the screen.

An alternate embodiment of the present invention is a projection display system comprising a first off-axis projector, a second off-axis projector, a third off-axis projector, a fourth off-axis projector, and a screen assembly, which includes a rear projection display screen. The screen assembly has a vertical center axis and a horizontal center axis segmenting the assembly into four quadrants. The first off-axis projector produces a first image that is directed via a first image path onto the first quadrant of the screen assembly. The first image intersects the segments of the vertical and horizontal center axes bounding the first quadrant of the screen assembly at substantially normal angles. The second off-axis projector produces a second image that is directed via a second image path onto the second quadrant of the screen assembly. The second image intersects the segments of the vertical and horizontal center axes bounding the second quadrant at substantially normal angles. The second image interfaces the first image at the segment of the vertical center axis common to the first and second quadrants. The third off-axis projector produces a third image that is directed via a third image path onto the third quadrant of the screen assembly. The third image intersects the segments of the vertical and horizontal center axes bounding the third quadrant of the screen assembly at substantially normal angles. The third image interfaces the first image at the segment of the horizontal center axis common to the first and third quadrants of the screen assembly. The fourth off-axis projector produces a fourth image that is directed via a fourth image path onto the fourth quadrant of the screen assembly. The fourth axis intersects the segments of the vertical and horizontal center axes bounding the fourth quadrant of the screen assembly at substantially normal angles. The fourth image interfaces the second image at the horizontal center axis common to the second and fourth quadrants of the screen assembly and interfaces the third image at the vertical center axis common to the third and fourth quadrants of the screen assembly.

The screen assembly preferably further includes means positioned in the first, second, third and fourth image paths adjacent to the rear surface of the rear projection display screen for receiving and straightening the first, second, third and fourth images, respectively. The image straightening means is most preferably a Fresnel lens, substantially covering the rear surface of the display screen. In accordance with one embodiment of the present invention, the first, second, third and fourth off-axis projectors are adjacently clustered in direct alignment with the screen assembly, such that the projectors' axes of intersection are substantially normal to the center axes of the screen assembly. In accordance with other embodiments, the first, second, third and fourth off-axis projectors are not directly aligned with the screen assembly. Instead, the first, second, third and fourth off-axis projectors are aligned in any number of alternate configurations relative to the screen assembly and the first, second, third and fourth image paths are folded by means of at least one reflector positioned in the first, second, third and fourth image paths to redirect the first, second, third and fourth images, respectively, onto the screen assembly.

In the above-recited embodiment, all four images are tiled across the entirety of the rear face of the screen assembly. The configuration of four off-axis projectors enables near perfect optical alignment of the four images at the interfaces corresponding to the vertical and horizontal center axes of the screen assembly. The four images are spaced less than one pixel apart, creating seams at the interfaces which are virtually indistinguishable to the viewer. Accordingly, the viewer observes an apparent single high quality contiguous image formed on the front face of the display screen from the combined images. The single on-screen image produced by tiling the four images of the four off-axis projectors onto a single screen has four times the resolution of an image of the same size produced by an equivalent single conventional off-axis projector onto the screen.

In addition to the above-described rear projection screen embodiments, the present projection display system can alternately employ the multiple (either two or four) off-axis projectors in a manner which projects the tiled images onto a conventional front projection screen, such as is found in movie theaters, conference rooms or auditoriums. The Fresnel lens is omitted from the front projection screen embodiments. However, the throw length is usually long and the projection angle is relatively small so that the brightness drop off at the screen edges is within acceptable limits. Alignment of the images is readily achieved because the front projection screen is typically a fixed distance from the projectors, as in the case of a ceiling mounted projector or a rear projection room. Where the distance between the front projection screen and the projectors is variable, as in the case of transportable projectors, means for providing convergence adjustment of the images is required. A convergence means for the present application are mechanical micropositioners which move either the projectors or mirrors associated with the projectors described hereafter. Convergence adjustment is facilitated by use of an alignment pattern on each projector.

The projection display system of the present invention provides a number of advantages over projection display systems of the prior art. In the case of the twin off-axis projector embodiment, the image source of the first off-axis projector is essentially aligned with only one half of its projection lens back focal plane so that only one half of the available image projection area of the lens is used. Therefore, the lens effectively projects only one half of an image onto one half of the screen. This image is brightest at its on-axis edge with brightness falling off in the direction of the opposite edge. The image source of the second off-axis projector is inverted to align with the opposite half of its projection lens back focal plane so that the lens projects a one half image onto the opposite half of the screen. The image from the second off-axis projector is likewise brightest at its on-axis edge. Accordingly, the apparent single image produced by tiling the two images from the first and second off-axis projectors has uniform brightness along the seam at the central axis of the screen. The brightness desirably drops off from the central axis toward the opposite edges of the screen in the manner of a single on-axis projector. Brightness uniformity is achieved in a similar manner with the four off-axis projector embodiment.

The projection display system of the present invention does not require precise geometric alignment of the projected images relative to the Fresnel lens to achieve the desired level of performance. Because the system employs only one Fresnel lens, the projected images can be moved around on the screen in unison without altering the display performance of the system. The above-described embodiments of the present projection display system, which employ a folded mirror design, provide good mechanical stability. These embodiments also enable relatively easy position adjustment of the projected images onto the screen simply by repositioning the reflectors. In sum, considerable cost advantages are realized by employing a plurality of conventionally sized projectors operating in a tiled configuration as compared to a single over-sized projector, which produces an on-screen image having the same resolution as that produced by the sum of smaller projectors. The present projection display system also advantageously has a shorter throw length in comparison to a single over-sized projector. In addition, the present projection display system enables selective variability of the aspect ratio, although each of the projectors used has a fixed standard aspect ratio. For example, two projectors, each having a 3:4 aspect ratio, can produce in combination, as taught herein, either a 4:6 (2:3) aspect ratio or a panoramic 3:8 aspect ratio, depending on the orientation of the projectors.

The present projection display system employing multiple (either two or four) projectors also provides relatively large high resolution on-screen images while using only one half or one fourth of the video bandwidth, respectively, as compared to an equivalent single large projector producing the same size on-screen image because the projectors of the present system are running in parallel. Thus, the present system utilizes multiple (either two or four) computer graphics interface cards operating at their standard resolution bandwidth to achieve relatively high resolution images. Considerable cost and performance advantages with respect to the drive electronics of the system are realized by operating the system at standard resolution bandwidths.

The present invention will be further understood, both as to its structure and operation, from the accompanying drawings, taken in conjunction with the accompanying description, in which similar reference characters refer to similar parts.

DESCRIPTION OF PREFERRED EMBODIMENTS

Figure 2:
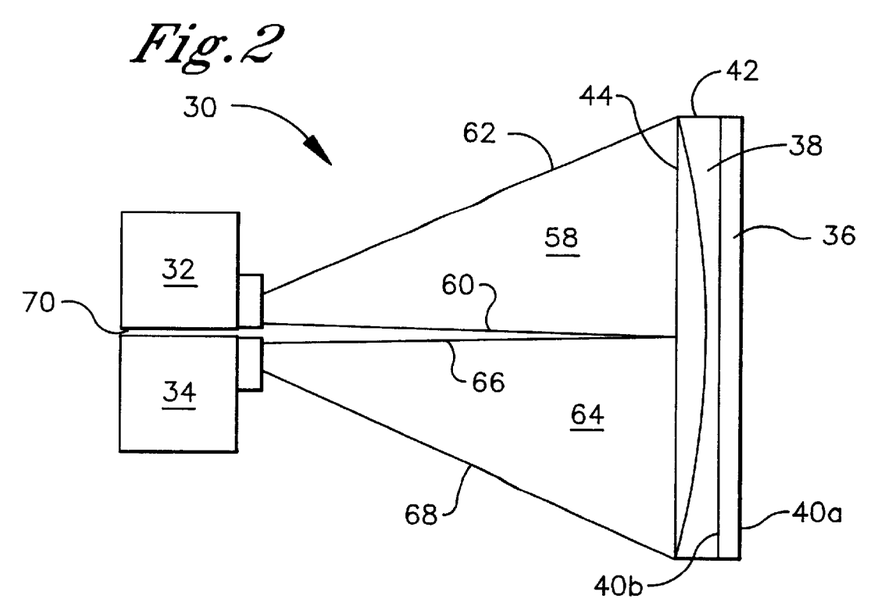
FIG. 2 is a conceptualized top view of a projection display system in accordance with the present invention, wherein two off-axis projectors are employed.

Referring to FIG. 2, a projection display system of the present invention is shown and generally designated 30. The projection display system 30 comprises a first off-axis projector 32, a second off-axis projector 34, a display screen 36, and a Fresnel lens 38. The display screen 36 can be substantially any diffuse surface used to establish a viewable image by rear projection. A preferred display screen 36 is a conventional, substantially planar, rear-illuminated, projection display screen. The planar display screen 36 has a front face 40a forming one side and a rear face 40b forming the opposite side. The system 30 is a rear projection display system, wherein the first and second off-axis projectors 32, 34, which serve as image sources, are positioned on the same side of the display screen 36 as the rear face 40b to project images through the Fresnel lens 38 onto the rear face 40b. The viewer (not shown) is positioned on the opposite side of the display screen 36 corresponding to the front face 40a to observe images on the front face 40a. Thus, the terms "behind the display screen" and "in front of the display screen" are used herein with reference to the viewer.

The Fresnel lens 38 is a relatively thin lens constructed with stepped setbacks, which has the optical properties of a much thicker lens. The Fresnel lens 38 is capable of receiving an image at a non-normal angle to the lens surface and redirecting the image such that the image exits the Fresnel lens 38 at a normal angle to the lens surface. The Fresnel lens 38 is positioned in the image paths of the first and second off-axis projectors 32, 34 adjacent to the rear face 40b of the display screen 36, thereby forming an integral screen assembly 42 with the display screen 36. The Fresnel lens 38 preferably corresponds substantially identically in areal dimensions and alignment with the rear face 40b. In a most preferred embodiment, the Fresnel lens 38 is affixed directly to the rear face 40b. of the display screen 36 or affixed to an associated mount (not shown).

Figure 3A:
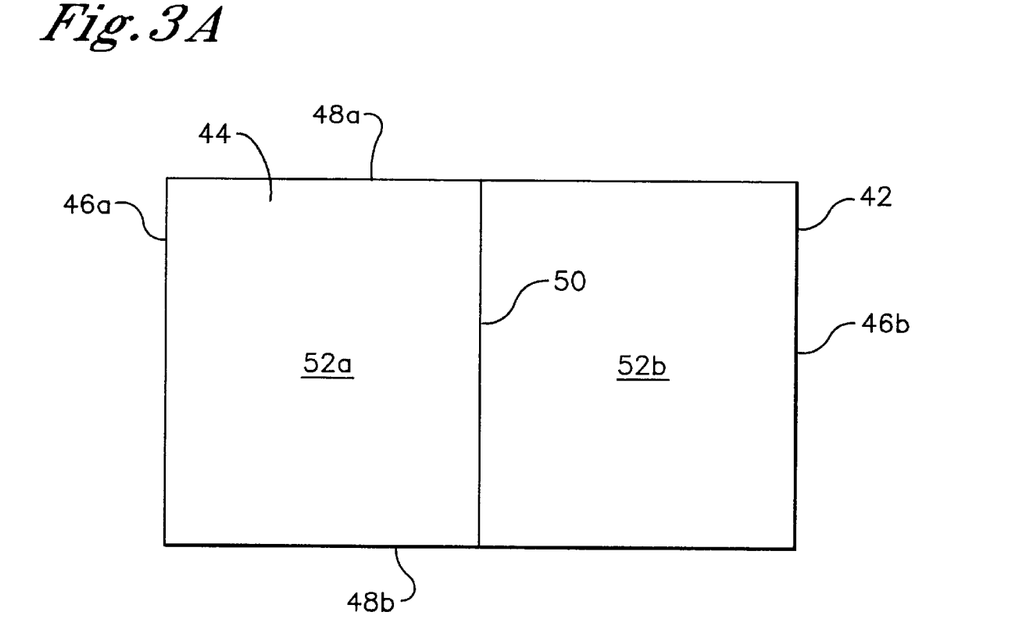
FIG. 3A is a conceptualized rear view of the screen assembly used in the projection display system of FIG. 2, wherein the screen assembly is segmented by a vertical center axis.

Referring additionally to FIG. 3A, the screen assembly 42 is shown from behind having a rear face 44. The screen assembly 42 is characterized as being relatively large, wherein the rear face 44 has a relatively large surface area. It is understood that the display screen 36 and Fresnel lens 38 have substantially identical areal dimensions as the screen assembly 42. Accordingly, the present dimensional characterization of the screen assembly 42 applies equally to the display screen 36 and Fresnel lens 48. By way of example, the screen assembly 42 is shown to have a substantially rectangular configuration, wherein the rear face 44 has height sides 46a, 46b each with dimensions of 15 inches and width sides 48a, 48b each with dimensions of 24 inches. These areal dimensions correspond to a pixel matrix on the display screen 36 of 1280 by 2048. This is about twice the areal and pixel matrix size of a conventional display screen having general utility for a broad range of applications. The screen assembly 42 can be further characterized as having a vertical center axis 50 bisecting the rear face 44 into a first vertical half 52a and a second vertical half 52b. The off-axis projectors 32, 34 are oriented to project their respective images onto specific segments of the rear face 44 defined by the vertical center axis 50 as will be described hereafter.

Figure 3B:
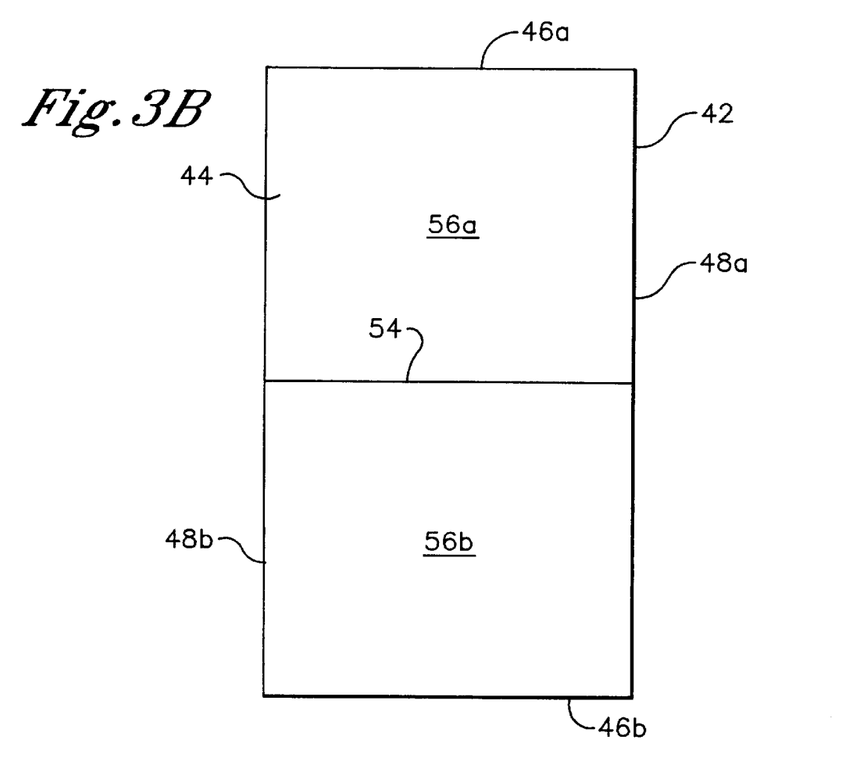
FIG. 3B is a conceptualized rear view of the screen assembly used in the projection display system of FIG. 2, wherein the screen assembly is rotated 90 degrees and segmented by a horizontal center axis.

Referring to FIG. 3B, an alternate orientation of the screen assembly 42 is shown which inverts the aspect ratio of the screen assembly 42. The sides 48a, 48b are the height sides of the screen assembly 42, the sides 46a, 46b are the width sides of the screen assembly and the height dimension of the screen assembly 42 is greater than the width dimension. The screen assembly 42 of FIG. 3B can also be characterized as having a horizontal center axis 54 bisecting the rear face 44 into a first horizontal half 56a and a second horizontal half 56b. The off-axis projectors 32, 34 are oriented to project their respective images onto specific segments of the rear face 44 defined by the horizontal center axis 54 as will be described hereafter.

Off-axis projectors having utility in the present projection display system 30 are high resolution projectors conventional to other illumination systems and applications. An off-axis projector is generally characterized as providing an image source that directs a light image along an image path onto a display medium, such as a display screen. The image axis is not aligned with the projector axis, causing the image distribution on opposing sides of the projector axis to be asymmetrical. Consequently, if a plane is positioned in the image path normal to the projector axis, the angles at which the rays of the projected image intersect the plane are unequal at points equidistantly positioned on opposite sides of the image axis. For example, one edge of the projected image can have a substantially normal angle of intersection with a plane normal to the projector axis, while the opposite edge of the projected image, which is the same distance from the projector axis as the other edge, can have a substantially acute angle of intersection with the plane.

In accordance with the present invention, the first off-axis projector 32 is capable of projecting a first image 58 along a first image path intersecting the screen assembly 42. More particularly, an interior edge 60 of the first image 58 intersects the vertical center axis 50 of the screen assembly 42 at a substantially normal angle of intersection, wherein the vertical center axis 50 is aligned substantially normal to the projector axis. An opposite exterior edge 62 of the first image 58 intersects the height side 46a of the screen assembly 42 at a substantially acute angle of intersection. The second off-axis projector 34 is preferably substantially identical to the first off-axis projector 32, capable of projecting a second image 64 along a second image path. More particularly, an interior edge 66 of the second image 64 intersects the vertical center axis 50 of the screen assembly 42 at a substantially normal angle of intersection and an opposite exterior edge 68 of the second image 64 intersects the height side 46b of the screen assembly 42 at a substantially acute angle of intersection. As such, the first and second images 58, 64 are tiled across substantially the entirety of the rear face 44 of the screen assembly 42.

The first and second off-axis projectors 32, 34 are preferably adjacently positioned in side-by-side mechanical alignment. Accordingly, their axis of intersection 70 is aligned with the interior edge 60 of the first image 58 and the interior edge 66 of the second image 64, normal to the vertical center axis 50 of the screen assembly 42. This configuration of adjacent first and second off-axis projectors 32, 34 projecting the interior edges 60, 66 substantially normal to the vertical center axis 50 of the screen assembly 42 enables near perfect optical alignment of the first and second images 58, 64 at an interface corresponding to the vertical center axis 50. The seam at the interface of the first and second images 58, 64 is virtually indistinguishable to the viewer, who observes an apparent single high-quality image formed on the front face 40a of the display screen 36 from the combined first and second images 58, 64.

As is apparent to the skilled artisan, the first and second images 58, 64 can alternatively be aligned with the horizontal center axis 54 of the screen assembly 42 as shown in FIG. 3B. The alternate alignment is achieved by rotating the first and second off-axis projectors 32, 34 and screen assembly 42 in unison 90° and fine tuning the positioning of the projectors 32, 34 relative to the horizontal center axis 54.

Figure 4:
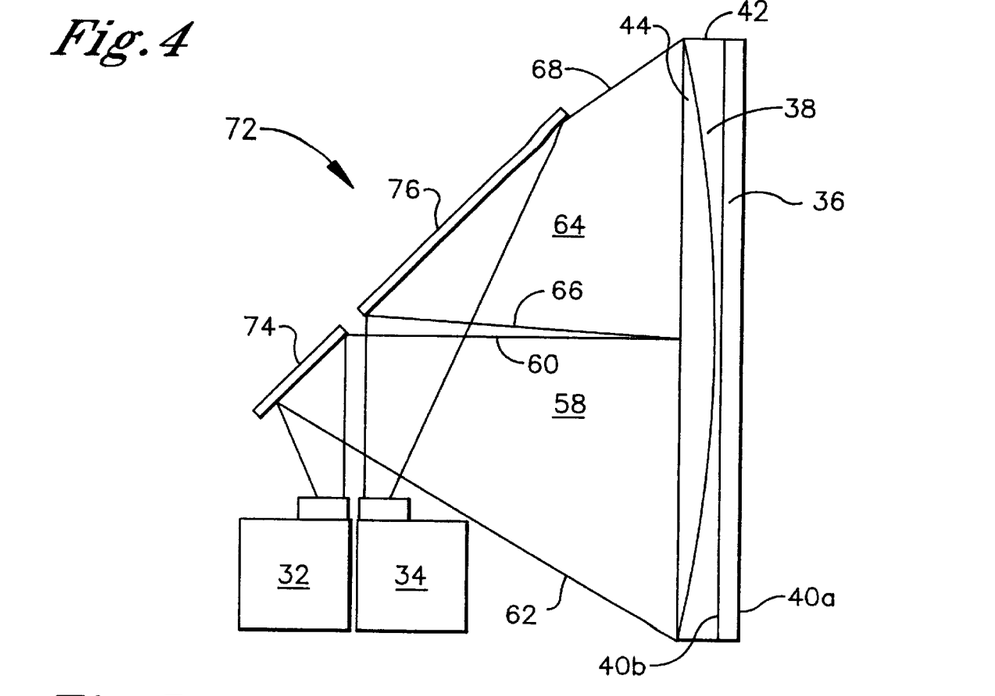
FIG. 4 is a conceptualized top view of an alternate embodiment of a projection display system in accordance with the present invention, wherein the positions of the two off-axis projectors are reconfigured and the image paths are folded.

In accordance with other embodiments of the present invention, the image paths of the first and second off-axis projectors 32, 34 can be compacted by folding the projection display system 30 using reflective surfaces to reduce the geometry of the system 30. Referring to FIG. 4, an example of a folded projection display system 72 is shown, wherein elements common to both systems 30, 72 are identified by the same reference characters. The first and second off-axis projectors 32, 34 are rotated in tandem 90° away from the screen assembly 42. The first and second images 58, 64 are directed from the first and second off-axis projectors 32, 34 onto first and second reflectors 74, 76, which redirect the first and second images 58, 64 onto the back face 44 of the screen assembly 42.

Figure 5:
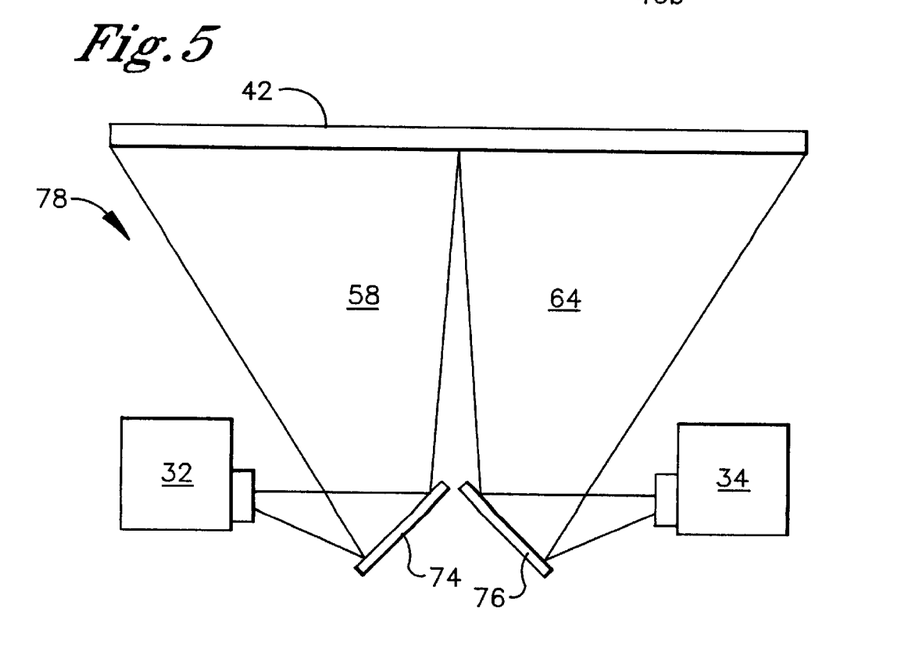
FIG. 5 is a conceptualized top view of an alternate embodiment of a projection display system in accordance with the present invention, wherein the positions of the two off-axis projectors are reconfigured in an alternate manner and the image paths are folded.

Referring to FIG. 5, another example of a folded projection display system 78 is shown, wherein elements common to systems 30, 72, 78 are identified by the same reference characters. The first and second off-axis projectors 32, 34 are each aligned with an opposite side of the screen assembly 42. The face of each projector 32, 34 is also rotated 90° away from the screen assembly 42, but in opposite directions of rotation such that the projectors 32, 34 face each other. The first and second images 58, 64 are directed from the first and second off-axis projectors 32, 34 onto first and second reflectors 74, 76, which redirect the first and second images 58, 64 onto the back face 44 of the screen assembly 42.

Figure 6:
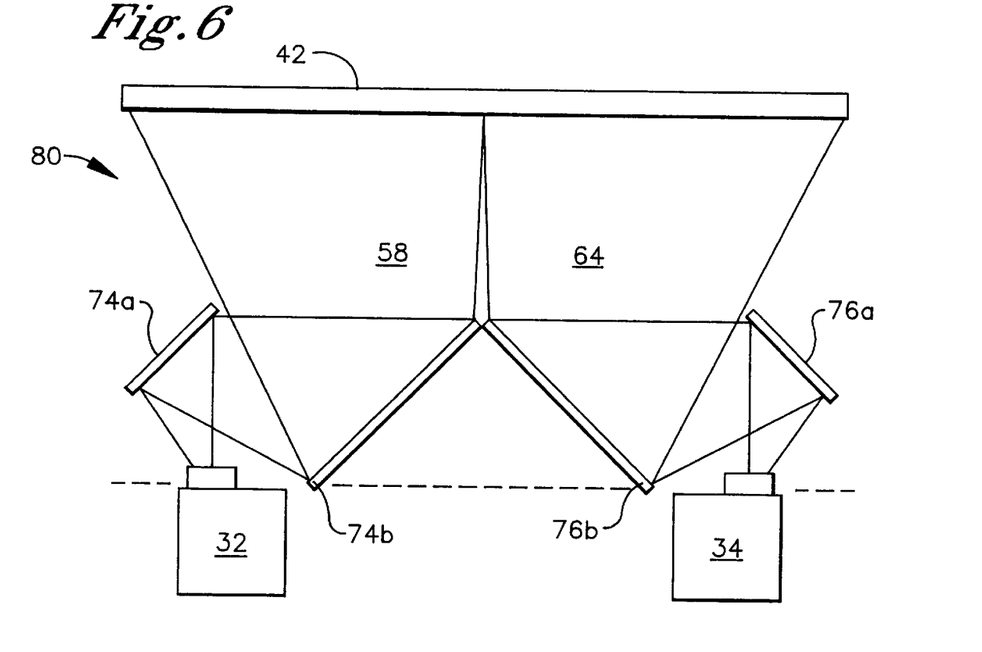
FIG. 6 is a conceptualized top view of an alternate embodiment of a projection display system in accordance with the present invention, wherein the positions of the two off-axis projectors are reconfigured in another alternate manner and the image paths are folded.

Referring to FIG. 6, another example of a folded projection display system 80 is shown, wherein elements common to systems 30, 72, 78, 80 are identified by the same reference characters. The first and second off-axis projectors 32, 34 are each aligned with an opposite side of the screen assembly 42 and face the screen assembly 42. The first and second images 58, 64 are directed from the first and second off-axis projectors 32, 34 onto first and second reflectors 74a, 76a, which redirect the first and second images 58, 64 onto third and fourth reflectors 74b, 76b and finally onto the back face 44 of the screen assembly 42.

Figure 7:
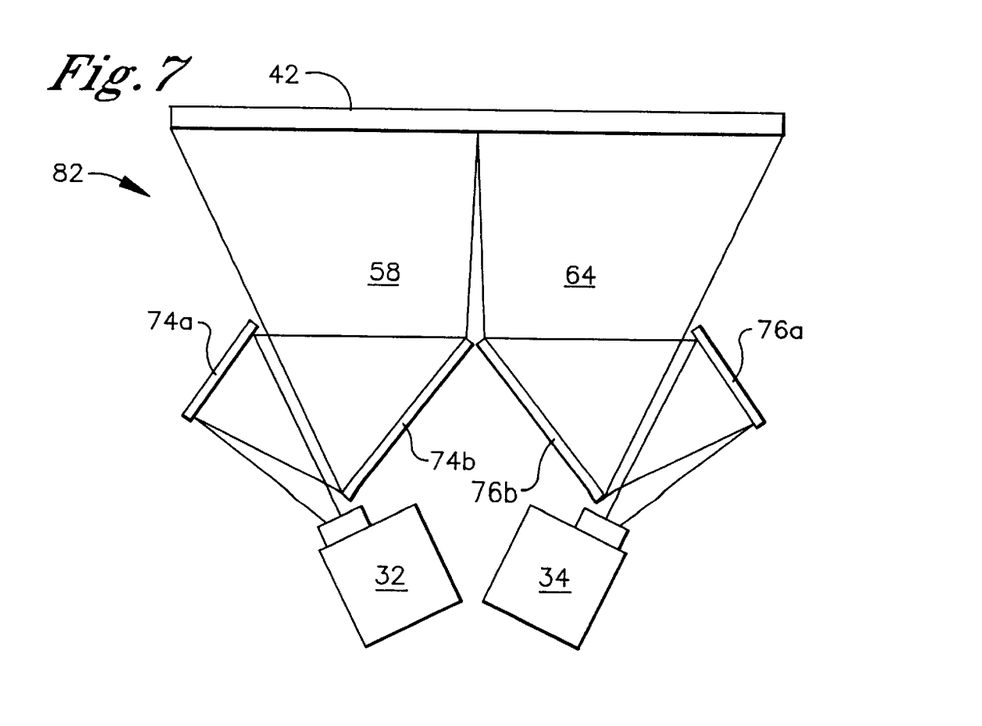
FIG. 7 is a conceptualized top view of an alternate embodiment of a projection display system in accordance with the present invention, wherein the positions of the two off-axis projectors are reconfigured in yet another alternate manner and the image paths are folded.

Referring to FIG. 7, yet another example of a folded projection display system 82 is shown, wherein elements common to systems 30, 72, 78, 80, 82 are identified by the same reference characters. The first and second off-axis projectors 32, 34 are initially positioned in alignment with the center of the screen assembly 42. However, the face of each projector 32, 34 is rotated an acute angle of about 30° to 45° away from the screen assembly 42 in opposite directions of rotation. The first and second images 58, 64 are directed from the first and second off-axis projectors 32, 34 onto the first and second reflectors 74a, 76a, which redirect the first and second images 58, 64 onto the third and fourth reflectors 74b, 76b and finally onto the back face 44 of the screen assembly 42.

Although the projection display systems 72, 78, 80, 82 are all folded, the on-axis edges of the projected images have a nearly normal orientation relative to the center axis of the screen assembly 42 in substantially the same manner as the system 30 to maintain the on-screen image quality. The folded projection display systems 72, 78, 80, 82 exhibit good mechanical stability. The position of the projected images onto the screen assembly 42 is also easily adjustable. The folded projection display systems 80, 82, which employ a pair of reflectors 74a, 76a and 74b, 76b for each projector 32, 34, respectively, specifically provide the systems 80, 82 with a high degree of compactness, positioning the projectors 32, 34 in close proximity and minimizing the center space angle between the projected images.

Figure 8:
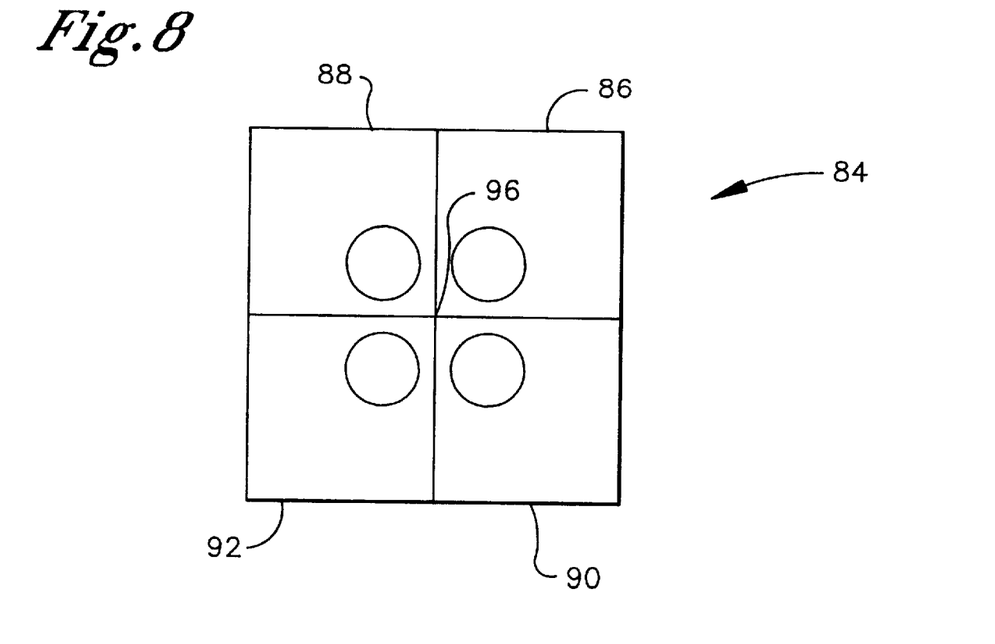
FIG. 8 is a conceptualized front view of a multiple off-axis projector configuration employing four off-axis projectors, which is used in an alternate embodiment of the projection display system of the present invention.
Figure 9:
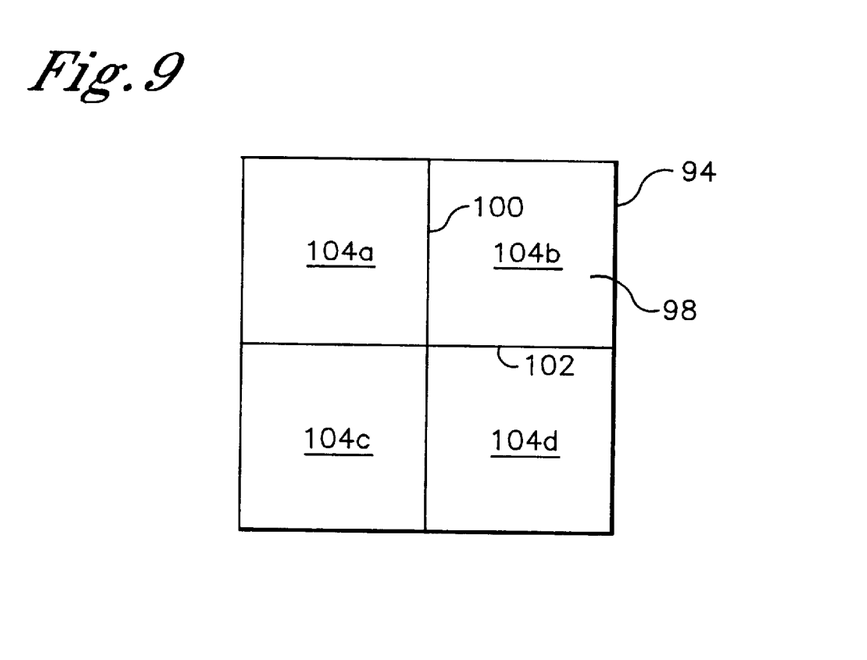
FIG. 9 is a conceptualized rear view of the screen assembly used in the projection display system of FIG. 8, wherein the screen assembly is segmented into quadrants by the vertical and horizontal center axes.

Referring to FIGS. 8 and 9, an alternate embodiment of a projection display system of the present invention is shown and generally designated 84. The projection display system 84 employs four off-axis projectors 86, 88, 90, 92 and a screen assembly 94, which double the image projection capability of the system 84 relative to the projection display system 30. The four off-axis projectors 86, 88, 90, 92 are clustered together around a common axis of intersection 96, which is substantially normal to the screen assembly 94. The screen assembly 94 includes the same elements as the screen assembly 42, but has essentially twice the surface area and correspondingly twice the number of pixels.

Referring specifically to FIG. 9, the screen assembly 94 is shown from behind having a rear face 98 segmented by a vertical center axis 100 and a horizontal center axis 102. The vertical and horizontal center axes 100, 102, in combination, segment the rear face 98 into a first quadrant 104a, a second quadrant 104b, a third quadrant 104c, and a fourth quadrant 104d. The off-axis projectors 86, 88, 90, 92 are substantially identical, with each off-axis projector capable of projecting an image that is simultaneously off-axis with respect to both the vertical and the horizontal. Each off-axis projector is oriented to project an image onto one distinct quadrant of the rear face 98. As such, first, second, third and fourth images (not shown) are tiled across substantially the entirety of the rear face 98. In particular, the first image is projected by the first off-axis projector 86 onto the first quadrant 104a, such that the adjacent vertical and horizontal interior edges of the first image intersect the segments of the vertical center axis and horizontal center axis bordering the first quadrant 104a at substantially normal angles, while the adjacent vertical and horizontal exterior edges intersect the segments of the outer sides of the rear face 98 bordering the first quadrant 104a at substantially acute angles. The second, third and fourth images are similarly projected onto the second, third and fourth quadrants 104b, 104c, 104d by the second, third and fourth off-axis projectors 88, 90, 92, respectively.

The present configuration of adjacent first, second, third and fourth off-axis projectors 86, 88, 90, 92 projecting adjacent interior edges substantially normal to the vertical and horizontal center axes 100, 102 of the screen assembly 94 enables near perfect optical alignment of the first, second, third and fourth images at interfaces corresponding to the vertical and horizontal axes 100, 102. The seams at the interfaces of the images are virtually indistinguishable to the viewer, such that an apparent single high-quality image is formed on the screen assembly 94 from the four combined images.

Figure 10A:
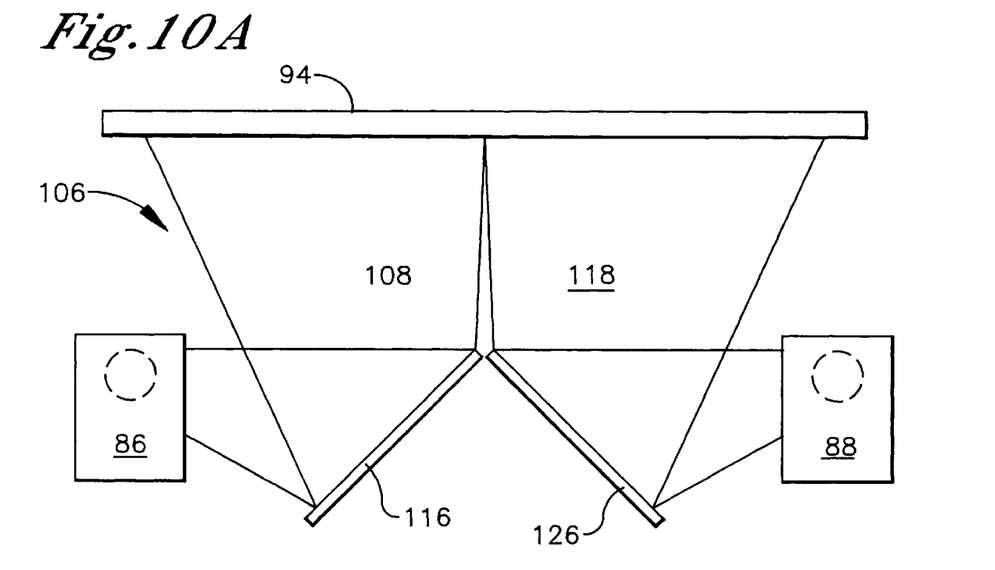
FIG. 10A is a conceptualized top view of an alternate embodiment of a projection display system in accordance with the present invention, wherein the positions of the four off-axis projectors are reconfigured and the image paths are folded.
Figure 10B:
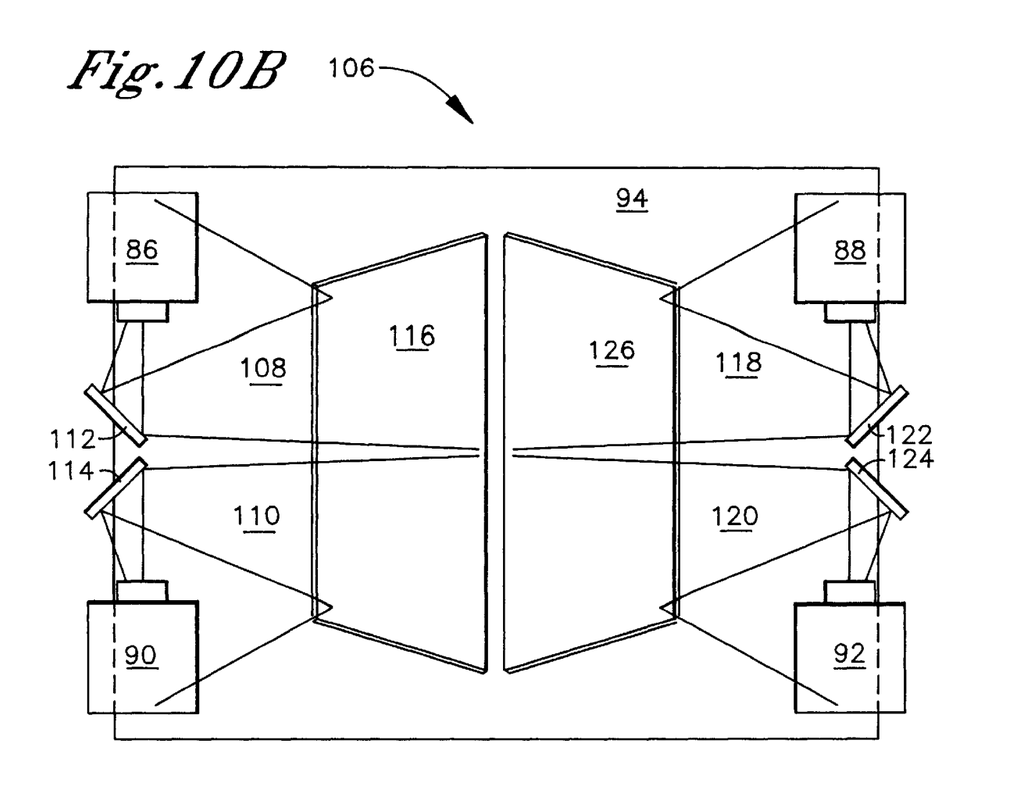
FIG. 10B is a conceptualized rear view of the projection display system of FIG. 10A.

The image paths of the first, second, third and fourth off-axis projectors 86, 88, 90, 92 can be compacted by folding the projection display system 84 using reflective surfaces to reduce the geometry of the system in a similar manner to that shown above with respect to the projection display systems 72, 78, 80, 82. Referring to FIGS. 10A and 10B, an example of a folded projection display system 106 is shown, wherein elements common to both systems 84, 106 are identified by the same reference characters. The first and third off-axis projectors 86, 90 are positioned in alignment with one edge of the screen assembly 94. The projectors 86, 90 face each other with the projector 86 facing down and the projector 90 facing up. The second and fourth off-axis projectors 88, 92 are positioned in alignment with the opposite edge of the screen assembly 94, also facing each other with the projector 88 facing down and the projector 92 facing up. First and third images 108, 110 are directed from the first and third off-axis projectors 86, 90 onto first and third reflectors 112, 114, which redirect the first and third images 108, 110 onto a fifth reflector 116 and onto the back face 98 of the screen assembly 94. Second and fourth images 118, 120 are directed from the second and fourth off-axis projectors 88, 92 onto second and fourth reflectors 122, 124, which redirect the second and fourth images 118, 120 onto a sixth reflector 126 and onto the back face 98 of the screen assembly 94.

As in the case of the folded twin projector systems 72, 78, 80, 82, the on-axis edges of the projected images of the present folded four projector system 106 have a nearly normal orientation relative to the center axes of the screen assembly 94 to maintain the on-screen image quality. The folded projection display system 106 exhibits good mechanical stability. The position of the projected images onto the screen assembly 94 is easily adjustable and the folded projection display system 106 has a high degree of compactness.

Although each embodiment of the present invention shown above employs a rear projection screen assembly, it is apparent to the skilled artisan that the multiple off-axis projectors can alternatively be employed with a conventional front projection screen in accordance with the present invention.

While the foregoing preferred embodiments of the invention have been described and shown, it is understood that alternatives and modifications, such as those suggested and others, may be made thereto and fall within the scope of the invention.

I claim:

1. A projection display system comprising:
   a screen assembly including a display screen, said screen assembly having a center axis segmenting said screen assembly into a first segment and a second segment;
   a first off-axis projector producing a first image directed via a first image path onto said first segment of said screen assembly, wherein said first image intersects said center axis at a substantially normal angle; and
   a second off-axis projector producing a second image directed via a second image path onto said second segment of said screen assembly and interfacing said first image at said center axis, wherein said second image intersects said center axis at a substantially normal angle.

2. The projection display system recited in claim 1, wherein said first off-axis projector is positioned substantially adjacent to said second off-axis projector.

3. The projection display system recited in claim 1, wherein said first and second off-axis projectors define an axis of intersection substantially normal to said center axis.

4. The projection display system recited in claim 1, wherein said center axis is a vertical center axis.

5. The projection display system recited in claim 1, wherein said center axis is a horizontal center axis.

6. The projection display system recited in claim 1, wherein said screen assembly further includes means positioned in said first and second image paths for receiving and straightening said first and second images.

7. The projection display system recited in claim 1, wherein said screen assembly further includes a Fresnel lens positioned in said first and second image paths.

8. The projection display system recited in claim 7, wherein said display screen has a front surface and a rear surface and said Fresnel lens is positioned adjacent to said rear surface.

9. The projection display system recited in claim 7, wherein said Fresnel lens substantially covers said rear surface.

10. The projection display system recited in claim 1, wherein said first and second off-axis projectors are positioned behind said screen assembly.

11. The projection display system recited in claim 1, wherein said first and second off-axis projectors are positioned in front of said screen assembly.

12. The projection display system recited in claim 1 further comprising at least one reflector positioned in said first or second image path to redirect said first or second image such that said first or second image path is folded.

13. The projection display system recited in claim 1, wherein said center axis is a vertical center axis and said screen assembly further has a horizontal center axis, said vertical and horizontal center axes segmenting said screen assembly into a first quadrant, a second quadrant, a third quadrant and a fourth quadrant, said first image directed onto said first quadrant and said second image directed onto said second quadrant, said system further comprising;
   a third off-axis projector producing a third image directed via a third image path onto said third quadrant, said third image intersecting said vertical center axis at a substantially normal angle; and
   a fourth off-axis projector producing a fourth image directed via a fourth image path onto said fourth quadrant and interfacing said third image at said vertical center axis, said fourth image intersecting said vertical center axis at a substantially normal angle.

14. The projection display system recited in claim 13, wherein said first and third images intersect said horizontal center axis at a substantially normal angle and said first image interfaces said third image at said horizontal center axis.

15. The projection display system recited in claim 13, wherein said second and fourth images intersect said horizontal center axis at a substantially normal angle and said second image interfaces said fourth image at said horizontal center axis.

16. A projection display system comprising:
   a screen assembly including a display screen and a Fresnel lens, said screen assembly having a center axis segmenting said screen into a first segment and a second segment;
   a first off-axis projector positioned behind said screen assembly producing a first image directed via a first image path onto said first segment of said screen assembly, wherein said first image intersects said center axis at a substantially normal angle; and
   a second off-axis projector positioned behind said screen assembly producing a second image directed via a second image path onto said second segment of said screen assembly and interfacing said first image at said center axis, wherein said second image intersects said center axis at a substantially normal angle, and further wherein said Fresnel lens is positioned between said display screen and said first and second off-axis projectors in said first and second image paths.

17. The projection display system recited in claim 16, wherein said first off-axis projector is positioned substantially adjacent to said second off-axis projector.

18. The projection display system recited in claim 16, wherein said display screen has a front surface and a rear surface and said Fresnel lens substantially covers said rear surface.

19. A projection display system comprising:
- a screen assembly including a display screen and a Fresnel lens, said screen assembly having a vertical center axis and a horizontal center axis segmenting said screen assembly into a first quadrant, a second quadrant, a third quadrant and a fourth quadrant;
- a first off-axis projector producing a first image directed via a first image path onto said first quadrant, wherein said first image intersects said vertical and horizontal center axes at a substantially normal angle;
- a second off-axis projector producing a second image directed via a second image path onto said second quadrant and interfacing said first image at said vertical center axis, wherein said second image intersects said vertical and horizontal center axes at a substantially normal angle;
- a third off-axis projector producing a third image directed via a third image path onto said third quadrant, said third image intersecting said vertical and horizontal center axes at a substantially normal angle; and
- a fourth off-axis projector producing a fourth image directed via a fourth image path onto said fourth quadrant and interfacing said third image at said vertical center axis, said fourth image intersecting said vertical and horizontal center axes at a substantially normal angle, and further wherein said Fresnel lens is positioned between said display screen and said first, second, third and fourth off-axis projectors in said first, second, third and fourth image paths.

20. The projection display system recited in claim 19, wherein said first image interfaces said third image at said horizontal center axis.

21. The projection display system recited in claim 20, wherein said second image interfaces said fourth image at said horizontal center axis.

* * * * *